(12) United States Patent
Kim et al.

(10) Patent No.: US 7,158,485 B2
(45) Date of Patent: Jan. 2, 2007

(54) METHOD FOR JOINING NODE INTO SUBNET OF POWER LINE COMMUNICATION NETWORK, ELECTRONIC APPLIANCE CONNECTED TO SUBNET, AND COMMUNICATION MODULE USED IN ELECTRONIC APPLIANCE

(75) Inventors: Chul Kim, Namyangju-shi (KR); Chung Ha Park, Kwangyok-shi (KR)

(73) Assignees: LG Electronics Inc., Seoul (KR); Planet System Co., Ltd., Seoul (KR)

( * ) Notice: Subject to any disclaimer, the term of this patent is extended or adjusted under 35 U.S.C. 154(b) by 1045 days.

(21) Appl. No.: 10/244,416

(22) Filed: Sep. 17, 2002

(65) Prior Publication Data

US 2003/0053477 A1     Mar. 20, 2003

(30) Foreign Application Priority Data

Sep. 17, 2001   (KR) .............................. 2001-57315

(51) Int. Cl.
*H04L 12/28*    (2006.01)
(52) U.S. Cl. .................................... 370/254; 370/395.3
(58) Field of Classification Search ................ 370/254, 370/255, 256, 257, 258, 293, 392, 389, 396, 370/351, 384, 401, 402, 312, 395.3
See application file for complete search history.

(56) References Cited

U.S. PATENT DOCUMENTS 6,199,112 B1 *   3/2001   Wilson ...................... 709/227
6,856,602 B1 *   2/2005   Westberg .................... 370/254
2002/0169914 A1  11/2002  Shteyn

FOREIGN PATENT DOCUMENTS

WO    WO 01/65703 A2   9/2001
WO    WO 01/82550 A2   11/2001

OTHER PUBLICATIONS

International Search Report; Austrian Patent Office; Aug. 12, 2003.

* cited by examiner

*Primary Examiner*—Brenda Pham
(74) *Attorney, Agent, or Firm*—McKenna Long & Aldridge LLP

(57) ABSTRACT

A method for providing a subnet identifier to a client node joining into the subnet includes communication modules in host and client nodes. In the host node, the communication module includes identifier storing means; mode setup means for setting up a response mode; response means for determining whether to respond according to the setup response mode upon receipt of an identifier request signal; a transceiver; condition input means selectively activated according to the setup response mode for inputting a node identifier; and condition determining means for comparing the node identifier included in the received identifier request signal with the node identifier inputted by the condition input means. In the client node, a communication module includes identifier generating means; a transceiver; a determining means for determining whether the data received through the transceiver is a response signal to its broadcasted identifier request signal; and an identifier storing means.

32 Claims, 9 Drawing Sheets

METHOD FOR JOINING NODE INTO SUBNET OF POWER LINE COMMUNICATION NETWORK, ELECTRONIC APPLIANCE CONNECTED TO SUBNET, AND COMMUNICATION MODULE USED IN ELECTRONIC APPLIANCE

This application claims the benefit of Korean Patent Application No. 2001-57315, filed on Sep. 17, 2001, which is hereby incorporated by reference for all purposes as if fully set forth herein.

BACKGROUND OF THE INVENTION

1. Field of the Invention

The present invention relates to a method for joining a node to a subnet of a communication network using an open communication medium while preventing home code overlap. More particularly, the present invention relates to a method of providing an identifier for identifying the subnet of an existing node to a node being joined to the subnet.

2. Discussion of the Related Art

Open communication mediums are communication mediums that are not only distributed within a predetermined control range, but also extend outside the predetermined control range. Accordingly, open communication mediums (e.g., a power lines) enable nodes within a predetermined control range to communicate with other node outside the predetermined control range.

Subnets (e.g., home networks) are portions of communication networks and comprise nodes (e.g., electronic appliances) that may communicate with each other via the aforementioned open communication medium. Generally, electronic appliances have a specific control range and may communicate with other electronic appliances within their specific control range via power lines found within a home network.

Communication between electronic appliances within a home network via power lines (i.e., power line networking) has been widely supported primarily because power line networking does not require extra communications mediums.

Power line networking requires electronic appliances within the specific control range transmit and receive data packets through power lines using a transceiver (e.g., a carrier-current transceiver). Further, power line networking requires the electronic appliances to be connected to an external communication network, such as the Internet, through a gateway.

Power lines within a home network do not constitute a closed distribution network within the specific control range but, rather, constitute an open distribution network (i.e., a network that branches from a power transmission site to each house network). Typically, data packets are transmitted between electronic appliances within open networks by employing broadcasting methods (i.e., transmission methods not using routers). Accordingly, data packets broadcasted by one electronic appliance within the specific control range are transmitted not only to other electronic appliances within the specific control range of the home network, but are also transmitted to electronic appliances existing outside the specific control range. Accordingly, open networks enable data packets transmitted from an electronic appliance in one house to be broadcasted to electronic appliances in other houses that are connected to the same power transmission site. One undesirable consequence of broadcasting within an open network occurs, however, when an electronic appliance located outside of a transmitting home network receives a command or other information within the broadcasted data packet in that the receiving appliance typically fails to function properly.

One method, proposed in order to solve the aforementioned problem, involves the installation of a blocking filter on a power line between the power transmission site and the home network. In theory, a blocking filter so installed could prevent data packets from being broadcasted to electronic appliances outside the transmitting home network. However, installing such a blocking filter is a relatively expensive solution to the aforementioned problem and it is often difficult to determine where an appropriate installation location exists. Moreover, information within data packets may still be leaked through other lines such as telephone lines, and the blocking filter may be improperly operated.

Data packets transmitted by electronic appliances found within home networks may include identifiers called home codes. Electronic appliances may selectively receive the transmitted data packets based on the identifier. For example, electronic appliances within the same home network must have the same identifier. Selection of a suitable identifier is essential to enable electronic appliances within a home network to communicate with each, according to their specific control range.

Methods for selecting a suitable identifier typically use hardware operating means, e.g., a dip switch. Using the hardware operating means, the identifier is selected by operating the dip switch prior to connecting the electronic appliance to a power line. As operating a dip switch may be difficult, an on-site service is usually provided by representatives of the electronic appliance companies wherein the representative confirms and adjusts the identifier for use within a particular home network. A problem still exists, however, that there is no proper method for detecting when an identifier selected in a first home network is identical to an identifier selected in a second home network, connected to the first home network by a power transmission site.

In order to solve the foregoing problem, the inventors of the present invention have disclosed "Power Line Communication Device Having Plug and Play Function" (non laid-open Korea patent application 10-2001-0011846, applied for registration on Mar. 7, 2001). The communication device disclosed in the non laid-open patent application includes a home code management module for managing a home code identifier that is uniformly provided to nodes existing within a specific control range among a plurality of nodes that are connected to a power line; an area code setup module for creating an area code identifier that is uniformly provided to nodes in the same area after the nodes existing within the control range are classified according to areas in which they exist; a group code setup module for creating a group code identifier that is uniformly provided to nodes of the same group by grouping the nodes existing within the control range according to predetermined correlations; and a device code management module for managing a device code identifier that is uniformly provided to each node. When power is connected to the respective nodes, the aforementioned modules automatically create a home code and an address to the nodes by broadcasting an identifier hail signal and receiving a response. While the aforementioned communication device solves problems related to dip switch operation, an algorithm used to detect and regulate home code overlap before generation of the home code is complicated.

SUMMARY OF THE INVENTION

Accordingly, the present invention is directed to a method for joining a node (e.g., an electronic appliance) to a subnet communication network using an open communication medium while preventing home code overlap, a node joined to the subnet, and a communication module in the node that substantially obviates one or more problems due to limitations and disadvantages of the related art.

The present invention provides an appliance connected as a node of the subnet, a method for joining the node into the subnet, and a communication module used by the node of the subnet.

The present invention also provides a communication network that detects and regulates home code overlap generated after a subnet is created. In one aspect of the present invention, the subnets are connected to the communication network via an open communication medium, each of the subnets include at least one node. In another aspect of the present invention, each of the nodes includes an identifier storing means for storing at least two kinds of identifiers as identifiers for identifying their subnet, an identifier generating means for adding at least one of the two types of identifiers within a data packet, and a transceiver for broadcasting a data packet. In another aspect of the present invention, the transceiver includes a subnet identifying means for identifying the subnet to which the node broadcasting the data packet belongs according to at least one of the two types of identifiers received within the broadcasted data packet.

An advantage of the present invention provides a method for generating an identifier for identifying an existing subnet to a node that is joined into the existing subnet using an open communication medium.

Another advantage of the present invention provides a method for generating an identifier for identifying an existing subnet to a node that is joined into the existing subnet within a communication network without interfering with the other subnets existing within the open communication range of a data packet broadcasted over a communication network via an open communication medium (e.g., power line).

In yet another aspect of the present invention, an electronic appliance may be provided as a node of the subnet.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages, and in accordance with the purpose of the invention, as embodied and broadly described herein, an electronic appliance may be used as a host node for providing an identifier identifying its subnet within a communication network to a node joined to the subnet. In one aspect of the present invention, the communication network may be composed of a plurality of nodes connected to each other via an open communication medium.

In one aspect of the present invention, each node includes an identifier storing means for storing the identifier for identifying its subnet; a transceiver for receiving an identifier request signal and broadcasting a response signal in response to receiving the identifier request signal; a mode setup means for receiving the identifier request signal and generating a response mode; and a response means for generating the response signal when the identifier request signal is received by the mode setup means provided in a response mode, wherein the response signal includes the identifier stored in the identifier storing means.

In one aspect of the present invention, an electronic appliance may be used as a client node for requesting an identifier to identify the subnet it is to join. In one aspect of the present invention, client node may include a node identifier generating means for generating a specific node identifier for identifying a node, an identifier storing means stores the node identifier generated by the node identifier generating means and stores an identifier included in the response signal as the identifier for identifying its subnet, a starting means for starting a subnet joining sequence, a transceiver for broadcasting an identifier request signal and receiving a response signal transmitted in response to the identifier request signal.

In one aspect of the present invention, components of the appliance may be provided as components for performing original functions of the appliance and as components within a communication module.

In another aspect of the present invention, a method is provided for enabling joining of nodes into existing subnets, wherein existing subnets are connected to a communication network via an open communication medium. Accordingly, the method provides an identifier to a client node requesting an identifier to identify its home subnet so that the client node may join into an existing subnet. The method for enabling joining of nodes into existing subnets may, for example, include preparing the host node to have a response mode; receiving an identifier request signal broadcasted by the client node; and broadcasting a response signal including the identifier for identifying the subnet of the node.

In another aspect of the present invention, a subnet joining method includes providing a node that is to join into an existing subnet of a communication network receives an identifier for identifying the existing subnet of a node provided as a host node among the nodes connected to the existing subnet, generating the identifier as an identifier for identifying the existing subnet, and joining the node into the existing subnet. The subnet joining method may further include generating and storing a specific node identifier for identifying a node; broadcasting the node identifier within an identifier request signal over the communication network; receiving a response signal transmitted in response to the identifier request signal on the communication network; determining whether the received response signal is a response signal transmitted in response to the identifier request signal broadcasted by the client node; storing an identifier included in the response signal transmitted in response to the broadcasted identifier request signal, wherein the stored identifier is the identifier identifying a home subnet.

In one aspect of the present invention, any subnet on the communication network may be identified using at least two types of identifiers. For example, a first identifier type may include a home code and a second identifier type may include a unique home ID.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

According to the principles of the present invention, a plurality of electronic appliances (i.e., nodes) connected to a power line (i.e., communication medium) each located within one of plurality of home networks (i.e., subnets) create a communication network.

Figure 1:
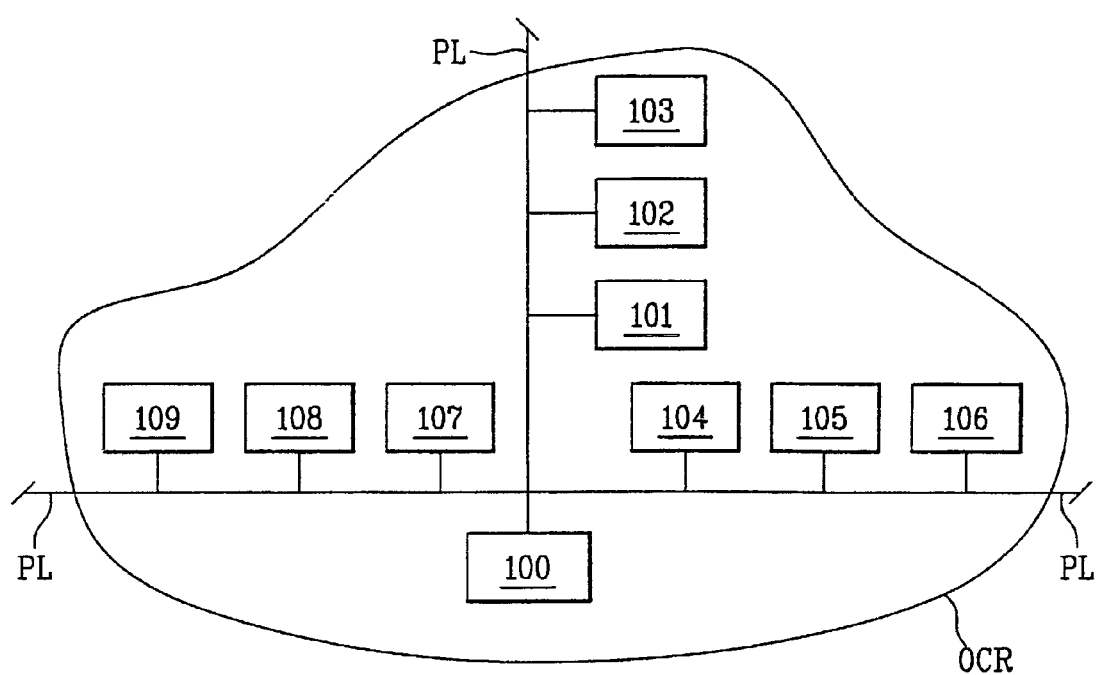
FIG. 1 illustrates a schematic block diagram of a communication network according to the principles of the present invention.
Figure 2:
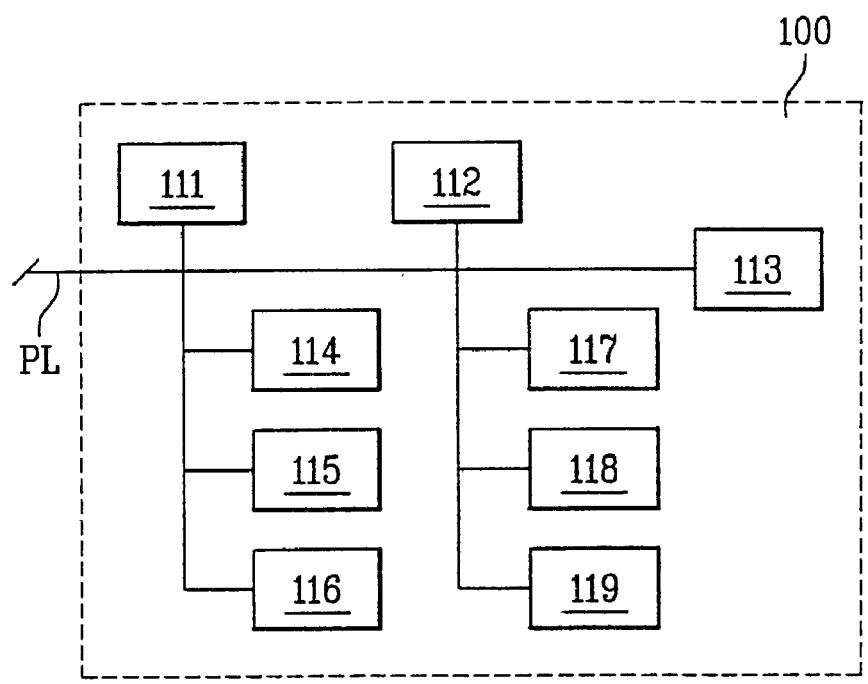
FIG. 2 illustrates a schematic block diagram of a subnet within the communication network shown in FIG. 1.

FIG. 1 and FIG. 2 schematically illustrate the communication network to which the present invention is applied and the subnet composing the communication network.

Referring to FIG. 1, reference numerals 100 to 109 represent a plurality of individual subnets connected a communication network via common power lines, PL. Subnets 100–109 are located on the communication network within a range allowing data packets broadcasted from one subnet to be received by another subnet. Thus, subnets 100–109 exist within an open distribution network and the communication range within which the data packets may be broadcasted to other subnets may be referred to as the open communication range (OCR).

Referring to FIG. 2, reference numerals 111 to 119 denote individual nodes within, for example, subnet 100. In one aspect of the present invention, nodes 111–119 may include appliances found within a particular network and capable of receiving power from an indoor power supply. When subnet 100 is created within, for example, a house, nodes 111–119 may include electronic appliances such as a computer, refrigerator, heater, kitchen utensil, or any other electronic appliance designed for use within a kitchen. When subnet is created within, for example, an office, nodes 111–119 may include electronic devices such as a computer, stereo, television, paper shredder, or any other electronic appliance designed for use within an office.

Figure 3:
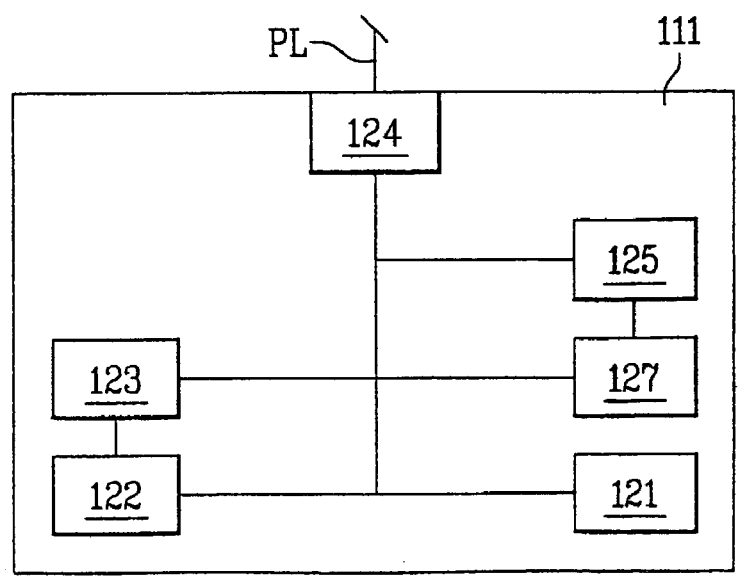
FIG. 3 illustrates a functional block diagram of a communication device used in a client node of the subnet shown in FIG. 2.
Figure 4:
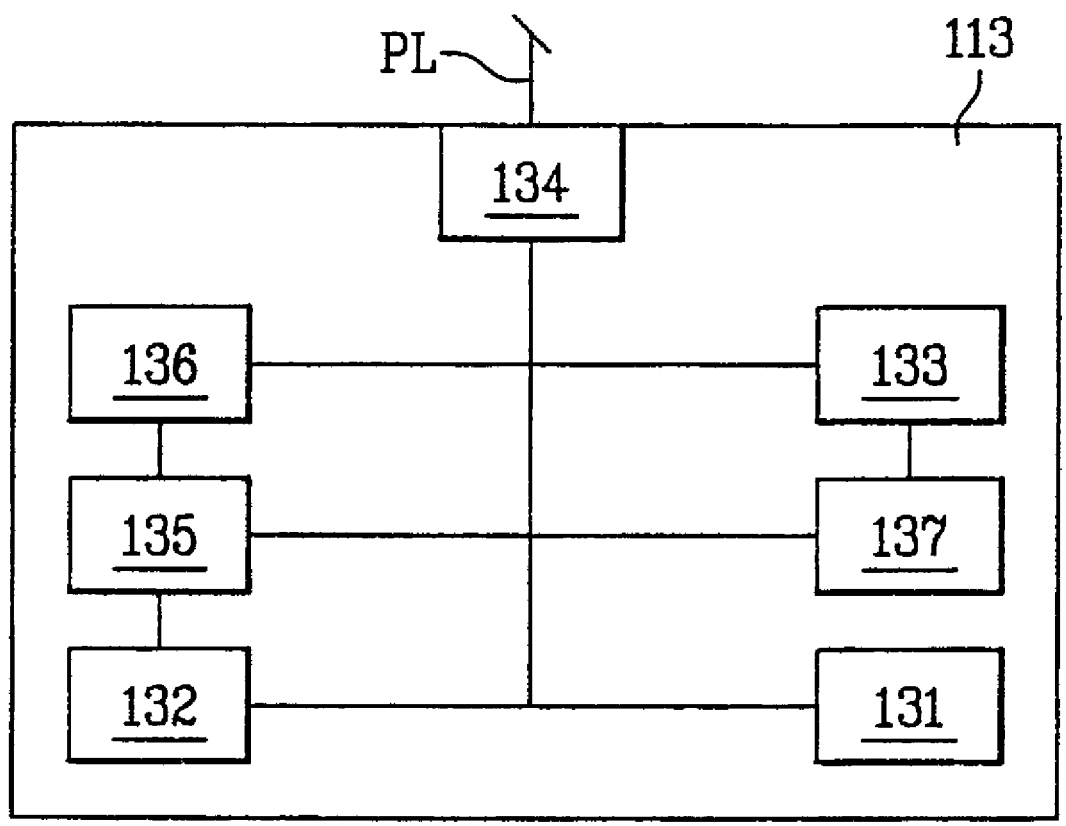
FIG. 4 illustrates a functional block diagram of a communication device used in a host node of the subnet shown in FIG. 2.
Figure 5:
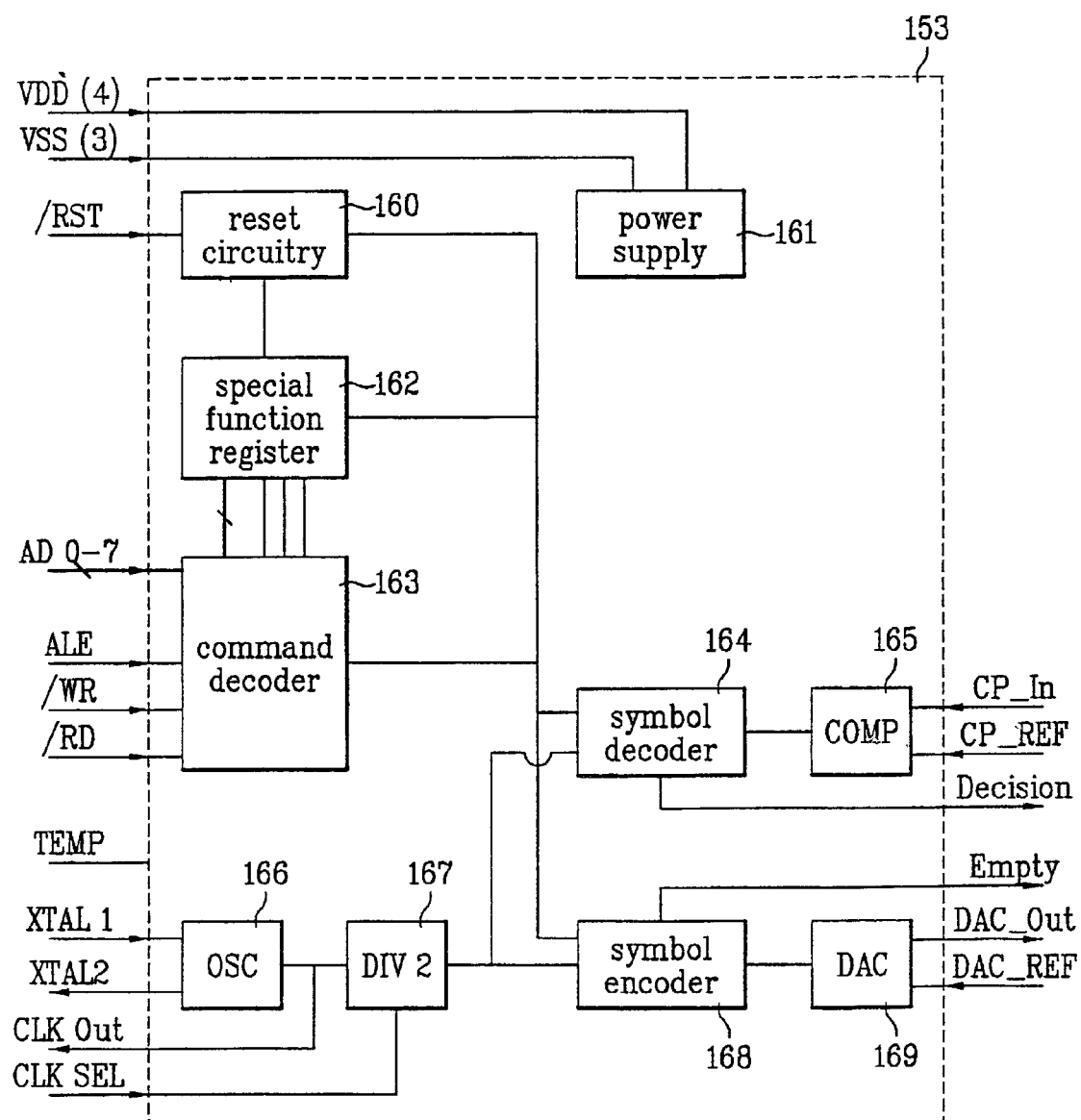
FIG. 5 illustrates a block diagram of components used in a communication module embodied as either of the communication devices in the client node or the host node.
Figure 6:
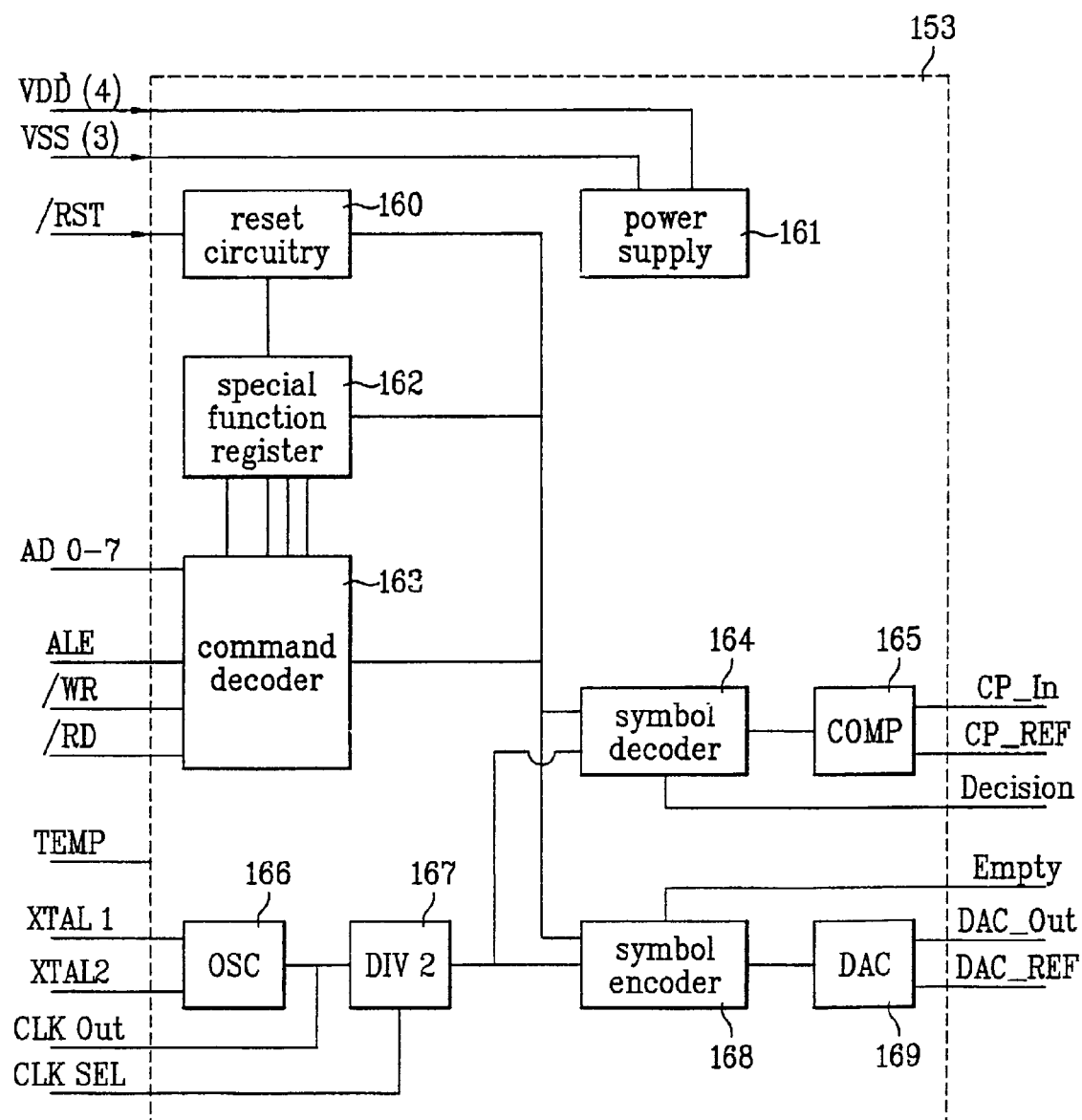
FIG. 6 illustrates a detailed block diagram of a protocol engine of the communication module of FIG. 5.

FIG. 3 illustrates a functional block diagram of a communication device used in a client node 111 requesting an identifier in embodying a subnet joining method in accordance with an embodiment of the present invention. FIG. 4 illustrates a functional block diagram of a communication device used in a host node 113 providing an identifier to the client node 111 requesting the identifier in a subnet joining method in accordance with an embodiment of the present invention. FIG. 5 illustrates a block diagram of components used in a communication module embodied as the communication device shown in FIG. 3 and FIG. 4. FIG. 6 illustrates a detailed block diagram of a protocol engine of the communication module shown in FIG. 5.

Figure 7:
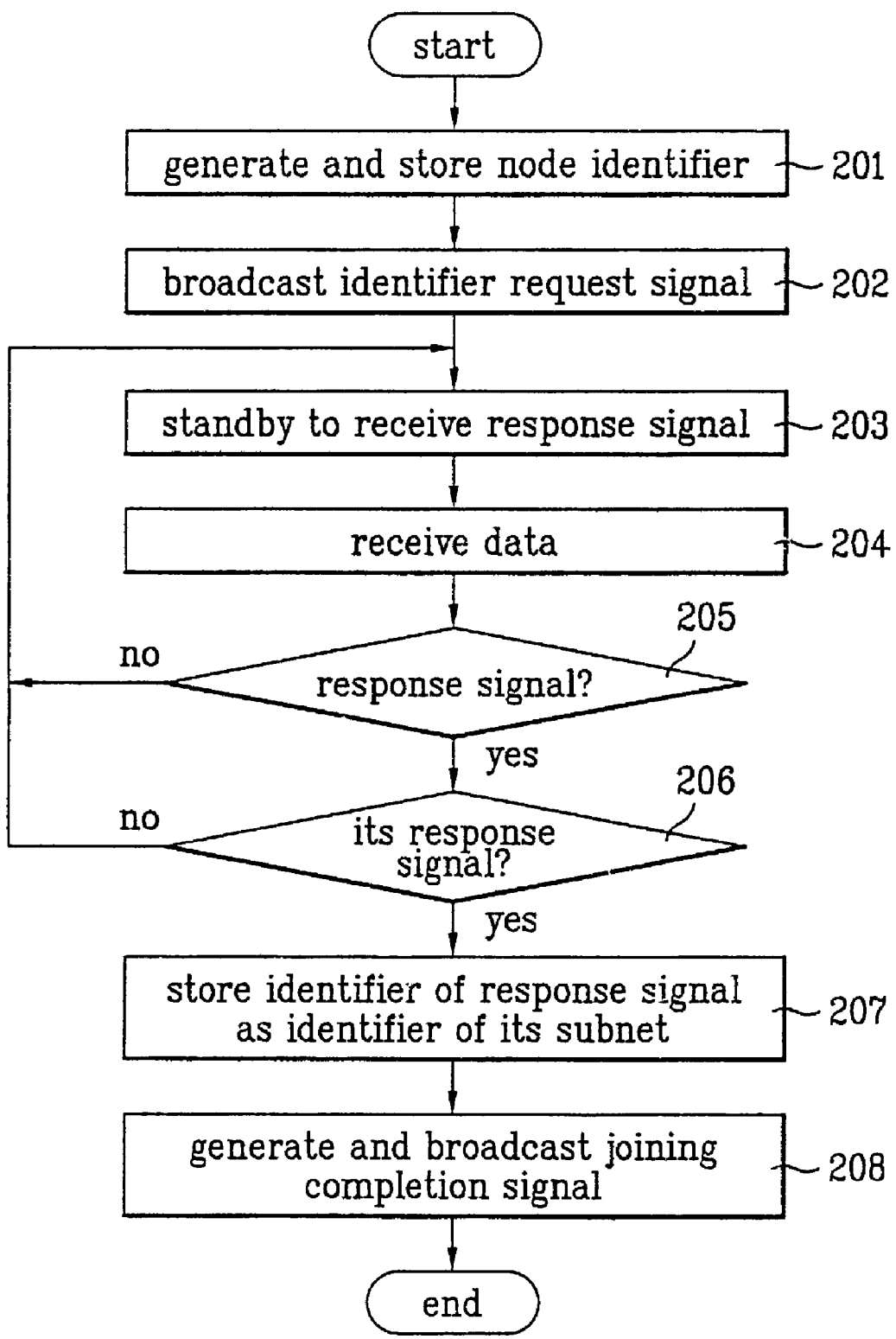
FIG. 7 illustrates a flowchart of a process followed by the client node shown in FIG. 3 during a subnet joining process in accordance with one embodiment of the present invention.
Figure 10:
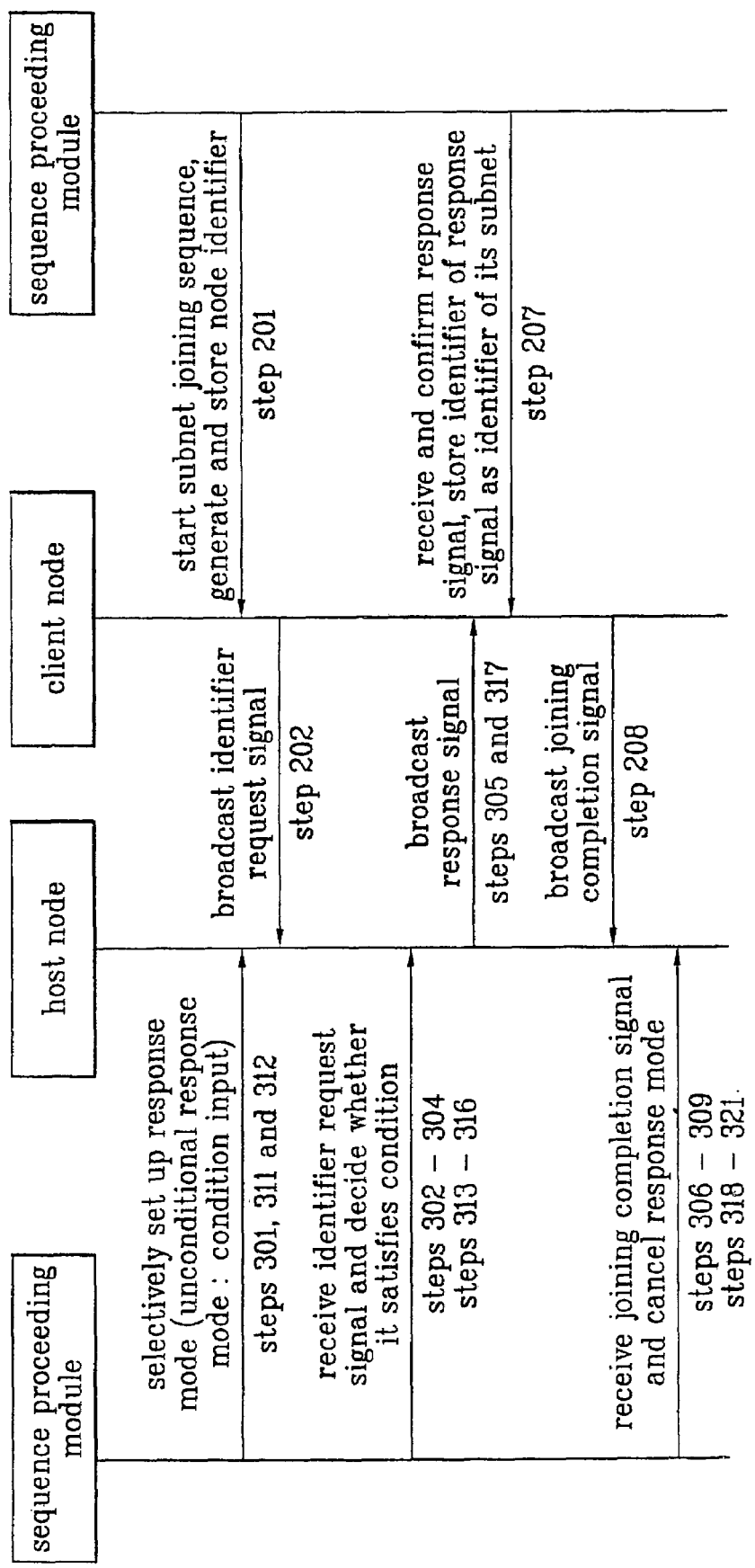
FIG. 10 illustrates a sequence map showing data processing flows between the host node and the client node in the processes shown in FIG. 7 to FIG. 9.

Referring to FIG. 3, the communication device included within the client node 111 may, for example, include a microprocessor 121 for controlling the execution of a communication control program such as that shown in the sequence map and flowchart of FIGS. 7 and 10; a starting means 122 for starting a subnet joining sequence; an identifier generating means 123 for generating a node identifier; a transceiver 124 for broadcasting a node identifier within an identifier request signal over the communication network; a determining means 125 for determining whether the data received through the transceiver 124 includes a signal transmitted in response to a broadcasted identifier request signal; and an identifier storing means 127 for storing an identifier included in the response signal as the identifier for identifying its subnet.

Figure 8:
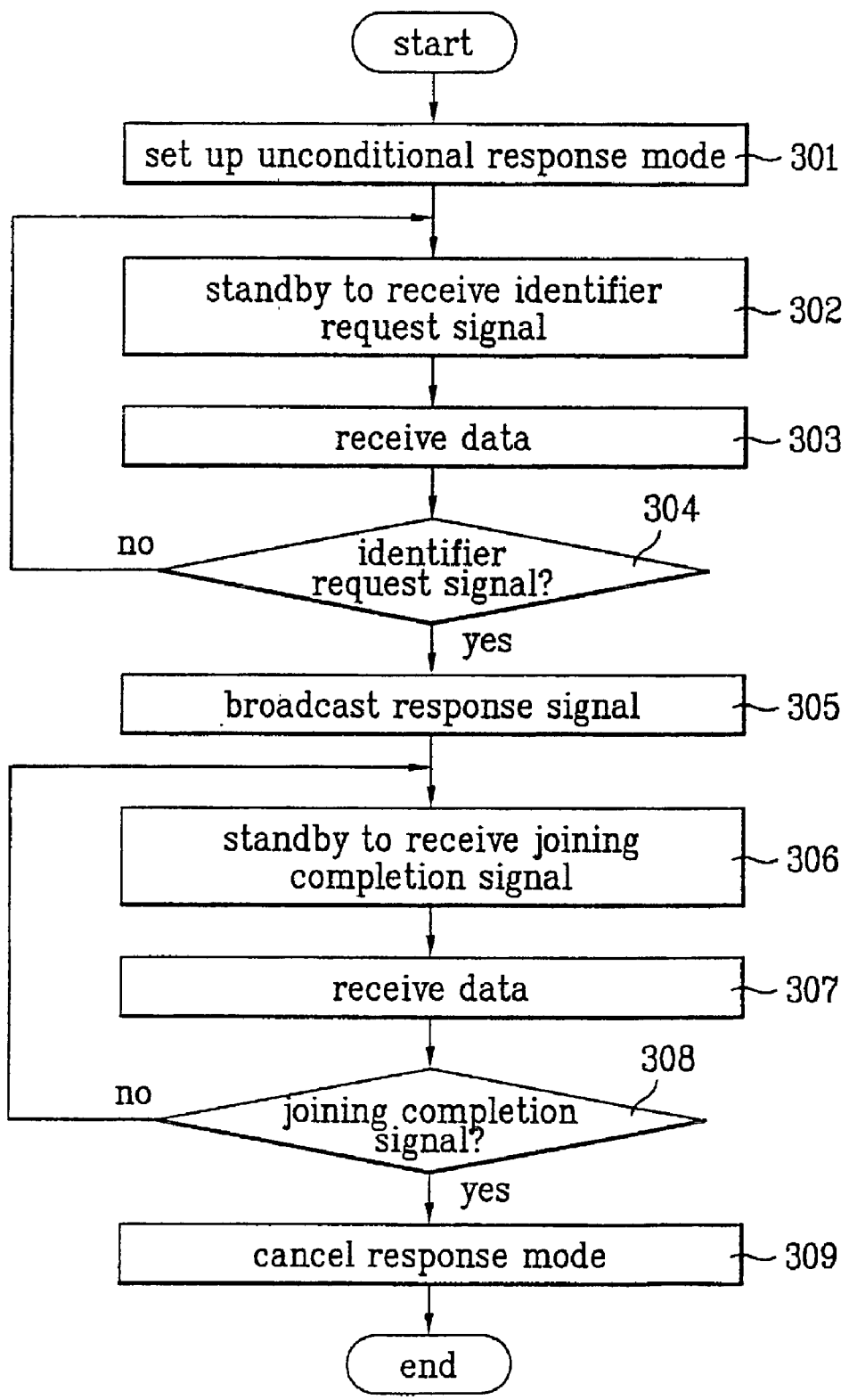
FIG. 8 illustrates a flowchart of a process followed by the host node shown in FIG. 4 during a subnet joining process in accordance with another embodiment of the present invention.
Figure 9:
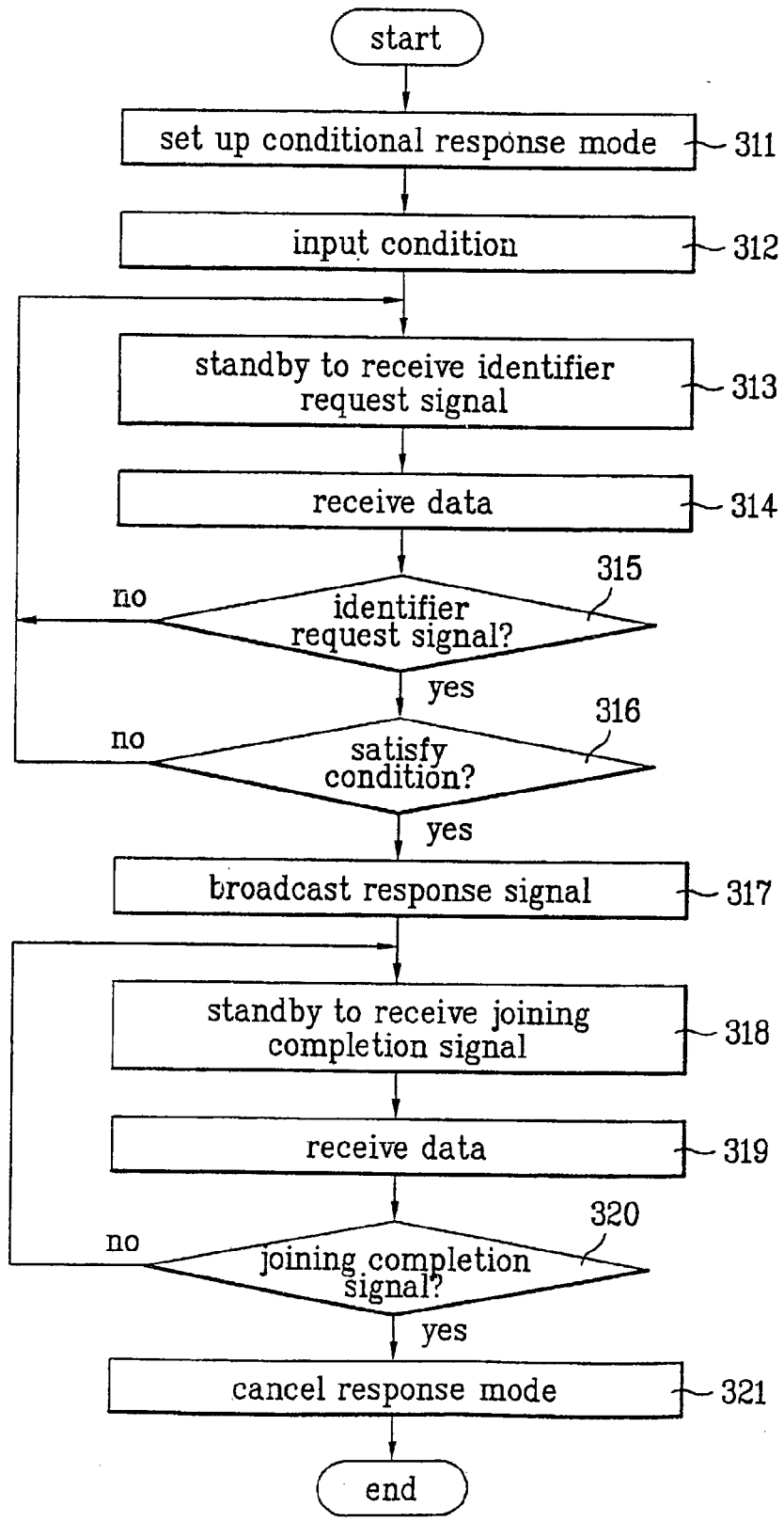
FIG. 9 illustrates a flowchart of a process followed by the host node shown in FIG. 4 during the subnet joining process in accordance with yet another embodiment of the present invention.

Referring to FIG. 4, the communication device included within the host node 113 may, for example, include a microprocessor 131 for controlling the execution of a communication control program such as that shown in the sequence map and flowcharts of FIG. 8 to FIG. 10; an identifier storing means 137 for storing an identifier that identifies its home subnet; a mode setup means 132 for preparing a response mode within the host node; a response means 133 for determining whether to respond according to the prepared response mode upon receipt of a broadcasted identifier request signal; and a transceiver 134 for broadcasting a response signal including the identifier over the communication network. Additionally, the host node 113 may include a condition input means 135 and a condition determining means 136 for preparing response conditions. The condition input means 135 inputs the node identifier and may be enabled or disabled according to the prepared response mode. The condition determining means 136 may include a comparator for comparing the node identifier included within the received identifier request signal against the node identifier inputted by the condition input means 135.

FIG. 5 illustrates a communication module embodied as the communication device within the client and host nodes, 111 and 113, respectively, as shown in FIGS. 3 and 4.

Referring to FIG. 5, the communication module processes transmitted/received data packets and includes a protocol engine (e.g., ZCT-2096) 153; a line driver 154 for receiving a signal from the protocol engine 153 and for outputting the signal to be transmitted through a power line; a power line carrier coupler 155 for transmitting the signal from the line driver 154 to the power line; and a receiving amplifier 156 for amplifying the signal received from the power line through the power line carrier coupler 155 and transmitting it to the protocol engine 153. In one aspect of the present invention, some of the signals transmitted from the line driver 154 to the power line carrier coupler 155 may be transmitted to the receiving amplifier 156 through a bandpass filter 157. The operation of the protocol engine 153 may be controlled by a micro controller unit 152 for executing a logic control program. The micro controller unit 152 may include a memory unit 159 that stores a control input value inputted through a user interface 151 or transmitted/received data packets or may be used as a communication buffer. Power supply 158 provides driving power suitable for operating the components within the communication device. In one aspect of the present invention, user interface 151 and the micro controller unit 152 communicate with each other using, for example, an RS232 connection. Devices and components of appropriate specifications may easily be purchased and combined to form the aforementioned components of the communication device except for the protocol engine 153.

FIG. 6 is a detailed block diagram illustrating the protocol engine 153 shown in FIG. 5.

Referring to FIG. 6, the protocol engine 153 may include a special function register 162 for storing identifiers; a comparator 165 provided for comparing information included in received signals with corresponding comparison reference values; a symbol decoder 164 for outputting a decision value according to the comparison result of the comparator 165; a symbol encoder 168 for encoding data to be transmitted through the power line; a digital to analog converter 169 for converting the output from the symbol encoder 168; a divider 167 for dividing a clock signal from an oscillator 166 and for outputting the clock signal according to a clock select value and for providing the clock signal to the symbol encoder 168; a reset circuitry 160 for resetting previously generated identifier values stored in the special function register 162; a command decoder 163 for controlling the operation of the various components of the protocol engine 153; and a power supply 161 for supplying power to the protocol engine 153.

When the communication device of the appliance commonly used in the client node 111 and the host node 113 is manufactured in form of the communication module of FIGS. 5 and 6, the function of the microprocessor 121 of FIGS. 3 and 4 is performed by the micro controller unit 152, the micro controller unit 152 determines processing of the received data according to the decision value of the symbol decoder 164 and the comparator 165, and the special function register 162 stores a setup value of the data to be compared by the comparator 165. The function of starting means 122 is performed either via interaction with a user through the user interface 151 or via the logic control program executed by the micro controller unit 152.

A process by which, for example, client node 111 shown in FIG. 3 receives an identifier from the host node 113 shown in FIG. 4 and is joined into subnet 100 (i.e., a subnet joining process) will now be described with reference to FIGS. 7 to 10.

FIG. 7 illustrates a flowchart of a process followed by the client node 111 during a subnet joining process in accordance with the present invention. FIG. 8 illustrates a flowchart of a process followed by the host node 113 during a subnet joining process. FIG. 10 illustrates a time series sequence map showing data processing flows between the transceiver 124 of the client node 111 and the transceiver 134 of the host node 113 and between the transceivers of each node and sequence proceeding modules during a subnet joining process.

In one aspect of the present invention, the subnet joining process may be performed not only when the node is connected to a subnet for the first time, but also when the node is joined into more than one subnet. The two subnet joining processes are substantially the same except that the latter requires an additional process of deleting a previously stored identifier and initializing the node (i.e., a subnet modifying process).

The starting means 122 may be provided as a program that automatically starts directly after power is connected to the node 111. Alternatively, the starting means 122 may be provided as a 'reset' switch activated by a user. To initiate the subnet modifying process, the user must either provide power to a previously powered-off node or activate the reset switch.

As illustrated in FIG. 7, when the subnet joining process starts, the node identifier generating means 123 generates a specific node identifier that identifies its home node and stores it in the identifier storing means 127 (step 201). Here, the node identifier includes a predetermined number of digits or letters may be provided by various methods. For example, a user may select a product serial number any number generated using a random number generating means. The product serial number, for example, may be stored in the identifier storing means 127 by a manufacturer of the node. If the product serial number is used as the node identifier, step 201 described above may be omitted.

After the node identifier is generated, the transceiver 124 of the client node 111 broadcasts an identifier request signal (step 202). The identifier request signal may be broadcasted in the form of a data packet. In one aspect of the present invention, the data packet may include a header and the node identifier, wherein the header includes information identifying the broadcasted signal as an identifier request signal.

After broadcasting the identifier request signal, the client node 111 maintains a standby state for a predetermined amount of time in order to receive a response signal transmitted in response to its broadcasted identifier request signal (step 204). When the client node 111 receives a data packet (step 204), it determines whether the data packet includes the response signal transmitted in response to its broadcasted identifier request signal (step 205).

The broadcasted identifier request signal is received by all powered-on nodes of subnets on the communication network existing within the open communication range. Generally, data packets broadcasted openly over a communication network include a home code that identifies the broadcasting node's home subnet. While all nodes within the open communication range receive the data packet, only nodes within subnets identified by the same home code recognize the data packet as containing valid information, process the data packet, and respond to it. Contrary to the aforementioned generalization, however, the identifier request signal broadcasted by the client node 111 does not include the home code. Accordingly, nodes existing within the open communication range do not recognize the received identifier request signal as containing valid information and therefore do not respond to it.

In accordance with the principles of the present invention, a user is required to connect a new node to an existing subnet. Accordingly, the user, via the mode setup means 132, selects a candidate node from the nodes belonging to an existing subnet to which the new node is to be connected and prepares the candidate node as the host node 113, wherein the host node 113 recognizes a broadcasted identifier request signal as containing valid information and responds to it. The mode setup means 132 may be activated by a select switch (not shown) on the candidate node that may be operated by the user. In one aspect of the present invention, the mode setup means 132 of the host node 113 selects and prepares one of an unconditional response mode or a conditional response mode. Upon preparing the response mode within the host node 113, mode setup means 132 allows the host node 113 to respond to a broadcasted identifier request signal. Upon preparing a non-responsive mode within the host node 113, mode setup means 132 does not allow the host node 113 to respond to a broadcasted identifier request signal.

Referring to FIG. 8, when, for example, the user selects and prepares the unconditional response mode within the host node 113 via the select switch of the mode setup means 132 (step 301) the host node 113 maintains the standby state in which it may receive a broadcasted identifier request signal (step 302). Upon receiving a data packet via transceiver 134 (step 303), the response means 133 determines whether the received data packet includes a broadcasted identifier request signal (step 304).

It may be determined whether the received data packet includes an identifier request signal by confirming whether predetermined data, for identifying the identifier request signal, exists within the header or at another position in the data packet (step 304). If it is determined that the received data packet does not include the identifier request signal, host node 113 processes the data or returns to step 302 and maintains the standby state. If it is determined that the received data packet does include the identifier request signal, the transceiver 134 broadcasts a response signal (step 305). The response signal may be broadcasted in the form of a data packet that includes identifiers suitable for identifying its home subnet (e.g., subnet 100) stored in the identifier storing means 137. For example, the broadcasted response signal includes the home code, unique home ID, and the node identifier of the client node 111 broadcasting the identifier request signal. In one aspect of the present invention, response signal may further include a header containing information identifying the data packet as a response signal.

Referring still to FIG. 8, when, for example, the user selects and prepares the conditional response mode within the host node via the select switch of the mode setup means 132 (step 311) and provides a node identifier using the condition input means 135 (step 312), the host node 113 maintains the standby state in which it may receive a broadcasted identifier request signal (step 313). Upon receiving a data packet via transceiver 134 (step 314).

It may be determined whether the received data packet includes an identifier request signal by confirming whether predetermined data, for identifying the identifier request signal, exists within the header or at another position in the data packet (step 315). If it is determined that the received data packet does not include the identifier request signal, host node 113 processes the data or returns to step 313 and maintains the standby state. If it is determined that the received data packet does include the broadcasted identifier request signal, the response means 133 then determines whether the received identifier request signal satisfies the response condition prepared by the condition determining means 136 (step 316). To satisfy the response condition, the node identifier of the client node 111 should be identical to the node identifier included within the received identifier request signal. Accordingly, host node 113 includes the condition input means 135 and the condition determining means 136. The condition input means 135 enables the user to provide the node identifier of the client node 111 as the condition that must be satisfied and the condition determining means 136 may include a comparator for comparing the node identifier included within the identifier request signal with the node identifier provided by the condition input means 135. The condition input means 135 is enabled only when the host node 113 is prepared with the conditional response mode via the mode setup means 132.

If it is determined by the condition determining means 136 that the two identifiers are identical, the response means 133 determines whether the received identifier request signal satisfies the condition. If it is determined that the identifier request signal does not satisfy the condition, host node 113 returns to step 313 and maintains the standby state to receive the identifier request signal. If it is determined that the identifier request signal does satisfy the condition, the transceiver 134 broadcasts the response signal (step 317).

When the client node 111 receives a data packet through its transceiver 124 (step 204), the determining means 125 determines whether the received data packet includes a response signal (step 205). It may be determined whether the received data packet includes a response signal by confirming whether predetermined data, for identifying the response signal, exists within the header or at another position of the data packet. If it is determined that the received data packet does not include the response signal, the client node 111 returns to step 203 and maintains the standby state. If it is determined that the received data packet does include the response signal, the determining means 125 determines whether the response signal includes a response signal transmitted in response to its broadcasted identifier request signal (step 206) by, for example, confirming whether its node identifier is included in the received data packet. If it is determined that the received data packet does not include the response signal transmitted to its broadcasted identifier request signal, the client node 111 returns to step 203 and maintains the standby state. If it is determined that the received data packet does include a response signal transmitted in response to its broadcasted identifier request signal, the client node 111 stores the identifiers included in the received response signal (e.g., the home code and unique home ID) in the identifier storing means 127. The stored identifiers are then used by client node 111 as identifiers identifying its home subnet (e.g., subnet 100) (step 207).

In one aspect of the present invention, as nodes are joined into a subnet for the first time, they may be prepared to have a response mode. After the nodes are joined into the subnet, they may be used as host nodes 113 and are prepared usually to have a non-response mode. If one node is prepared to have the response mode (e.g., an unconditional response mode) while another node is newly joined to an outside subnet existing within the open communication range, the newly joined node ignores the broadcasted identifier request signal. Accordingly, the newly joined node interrupts the subnet joining process or generates an identifier setup error leading to serious confusion. In order to minimize confusion, upon storing the identifier (see step 207) the client node 111 generates and broadcasts a subnet joining completion signal over the communication network (step 208). The host node 113 broadcasts the response signal on the communication network (steps 305 and 317), and maintains a standby state until it receives the joining completion signal (steps 306 and 318). When the host node 113 receives a data packet (steps 307 and 319), it determines whether the data packet includes the joining completion signal (steps 308 and 320). If it is determined that the data packet does include the joining completion signal, the host node 113 cancels the response mode (steps 309 and 321). While it has been described that the response mode is canceled according to, for example, steps 208, 306 to 309, and 318 to 321, the response mode may alternately be cancelled by a response mode canceling means (not shown). The response mode canceling means may be provided as an automatic canceling means for automatically canceling the response mode of the host node 113 after a predetermined time. Alternatively, the response mode may be canceled by combinations of the two aforementioned methods.

Referring to the sequence map of FIG. 10, the data processing for the subnet joining process between the nodes distributed on the communication network and in each of the nodes may be temporally diagrammed. It should be recognized that the sequence proceeding modules of FIG. 10 represent hardware and software means for processing data in client node 111 and the host node 113 according to the principles of the present invention.

The client node 111 completing the subnet joining includes the home code and/or unique home ID, stored in the identifier storing means 127, within data packets that may be broadcasted at later points in time. Additionally, client node 111 may recognize data packets having the same home code and/or unique home ID as those stored in its identifier storing means 127 as containing valid information. Accordingly, the client node may communicate with other nodes belonging to its home subnet (e.g., subnet 100).

In one aspect of the present invention, the unique home ID may not be included within all data packets broadcasted by the client node 111. Rather, the unique home ID may be included in data packets broadcasted related to, for example, specific commands.

When a node of one subnet is to be either transferred to a different subnet in a different location on the communication network or joined into other existing subnet(s) while remaining in the same location on the communication network (i.e., a subnet modifying process), the node must be initialized. Upon initializing the node, the home code, unique home ID, and other addresses stored in the identifier storing means 127 are deleted and the above-described subnet joining sequence is started. Accordingly, the starting means of the node may include a reset switch.

While it has been described that each node may include transceivers 124 and 134, starting means 122, node identifier setup means 123, determining means 125, mode setup means 132, node condition input means 135, condition determining means 136, response means 133, identifier storing means 127 and 137, and microprocessors 121 and 131, it is recognized that each of the nodes may comprise other components allowing the above described communication to be performed. Further, other constitutional elements and means generally required for communication as well as the components and means for performing the original function of the node may be included. For example, microprocessor 121 and 131 may be used for controlling the communication functions of the node or for controlling the original function of the appliance. Additionally, the constitutional elements of the communication device may either be incorporated within the node itself or in a separate communication module, an encoding means (not shown) or a decoding means (not shown) for processing transmitted data.

In one aspect of the present invention, the communication network may be provided within a communications medium such as a power line, telephone line, cable, or any other medium through which data may be broadcasted.

In accordance with the present invention, the process for joining the appliance as the node of the subnet is automatically performed without requiring complicated recording or operations except that the user sets up the response mode in the host node.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A node of a communication network, the communication network comprised of a plurality of subnets, the node comprising:
   an identifier storing means for storing an identifier identifying its home subnet;
   a transceiver for receiving an identifier request signal and broadcasting a response signal over the communication network in response to a transmitted identifier request signal;
   a mode setup means for receiving the identifier request signal and generating a response mode; and
   a response means for generating the response signal when the identifier request signal is received by the mode setup means provided in a response mode, wherein the response signal comprises the identifier stored in the identifier storing means.

2. The node according to claim 1, further comprising:
   a condition input means for inputting a condition in response to the identifier request signal; and
   a condition determining means for determining whether the received identifier request signal satisfies the condition inputted by the condition input means, wherein the response means generates the response signal in response to an identifier request signal that is determined to satisfy the condition inputted by the condition determining means.

3. The node according to claim 2, wherein
   the condition input means inputs a node identifier of a client node as the condition; and
   the condition determining means compares a node identifier included in the received identifier request signal with the node identifier inputted by the condition input means, and determines whether the identifier request signal satisfies the condition when the node identifiers are identical.

4. The node according to claim 3, wherein the mode setup means comprises a response mode canceling means for canceling the response mode.

5. The node according to claim 4, wherein the response mode canceling means automatically cancels the response mode after a predetermined amount of time from when the mode setup means generates the response mode.

6. The node according to claim 4, wherein the mode setup means generates one of an unconditional response mode and a conditional response mode.

7. The node according to claim 6, wherein the condition input means is enabled only when the mode setup means generates the conditional response mode.

8. The node according to claim 1, further comprising:
a node identifier generating means for generating a specific node identifier for identifying a node, wherein
the identifier storing means stores the node identifier generated by the node identifier generating means.

9. The node according to claim 1, further comprising:
a starting means for starting a subnet joining sequence, wherein the transceiver broadcasts the identifier request signal over the communication network and receives a response signal transmitted in response to the identifier request signal when the starting means starts the subnet joining sequence, wherein
the identifier storing means stores the identifier included in the response signal as the identifier for identifying its subnet.

10. A communication module connected to a communication network, the communication network comprised of a plurality of subnets, the communication module comprising:
an identifier storing means for storing an identifier for identifying its home subnet;
a transceiver for receiving an identifier request signal and broadcasting a response signal over the communication network in response to the identifier request signal;
a mode setup means for receiving the identifier request signal and generating a response mode; and
a response means for generating a response signal when the identifier request signal is received by the mode setup means provided in a response mode, wherein the response signal comprises the identifier stored in the identifier storing means.

11. The communication module according to claim 10, further comprising:
a condition input means for inputting a condition in response to the identifier request signal; and
a condition determining means for determining whether the received identifier request signal satisfies the condition inputted by the condition input means, wherein the response means generates the response signal in response to an identifier request signal that is determined to satisfy the condition inputted by the condition determining means.

12. The communication module according to claim 11, wherein
the condition input means inputs a node identifier of a client node as the condition; and
the condition determining means compares a node identifier included in the received identifier request signal with the node identifier inputted by the condition input means, and determines whether the identifier request signal satisfies the condition when the node identifiers are identical.

13. The communication module according to claim 12, wherein the mode setup means comprises a response mode canceling means for canceling the response mode.

14. The communication module according to claim 13, wherein the response mode canceling means automatically cancels the response mode after a predetermined amount of time from when the mode setup means generates the response mode.

15. The communication module according to claim 13, wherein the mode setup means generates one of an unconditional response mode and a conditional response mode.

16. The communication module according to claim 15, wherein the condition input means is enabled only when the mode setup means generates the conditional response mode.

17. The communication module according to claim 10, further comprising:
a node identifier generating means for generating a specific node identifier for identifying a node, wherein
the identifier storing means stores the node identifier generated by the node identifier generating means.

18. The communication module according to claim 10, further comprising:
a starting means for starting a subnet joining sequence, wherein the transceiver broadcasts the identifier request signal over the communication network and receives a response signal transmitted in response to the identifier request signal when the starting means starts the subnet joining sequence, wherein
the identifier storing means stores the identifier included in the response signal as the identifier for identifying its subnet.

19. A method for joining a node into an existing subnet, wherein existing subnets are connected to a communication network via an open communication medium, to provide an identifier to a client node requesting an identifier identifying its subnet so that the client node can join into an existing subnet, comprising:
providing a host node to have a response mode;
receiving an identifier request signal broadcasted by the client node; and
broadcasting a response signal including the identifier identifying the existing subnet of the host node;
inputting a condition to the host node, wherein the condition determines whether the received identifier request signal is an identifier request signal which needs to be responded to; and
determining whether the received identifier request signal satisfies the condition inputted in the condition input step.

20. The method according to claim 19, wherein the response mode setup generates one of an unconditional response mode and a conditional response mode.

21. The method according to claim 19, further comprising a step for canceling the response mode of the host node after broadcasting the response signal.

22. The method according to claim 21, wherein the host node receives a subnet joining completion signal broadcasted by the client node over the communication network and subsequently cancels the response mode.

23. The method according to claim 21, wherein the response mode canceling step automatically cancels the response mode after a predetermined amount of time from when the response mode is generated in the host node.

24. The method according to claim 21, wherein the response signal broadcasting step adds a node identifier included in the received identifier request signal to the response signal and broadcasts the response signal.

25. The method according to claim 19, wherein the condition input step inputs a node identifier of the client node as the condition, and the condition determining step determines whether the received identifier request signal includes the node identifier inputted in the condition input step.

26. The method according to claim 21, wherein the identifier includes a home code and a unique home ID.

27. The method according to claim 21, wherein the open communication medium comprises a power line.

28. A subnet joining method, comprising:
generating and storing a specific node identifier for identifying a host node;

broadcasting an identifier request signal by a client node over the communication network;

receiving a response signal, the response signal including the identifier identifying the existing subnet of a host node;

determining whether the received response signal is a response signal transmitted in response to the identifier request signal broadcasted by the client node; and storing an identifier included in the response signal if it is determined that the response signal is a response signal transmitted in response to the identifier request signal broadcasted by the client node.

29. The method according to claim 28, wherein the determining includes determining whether the response signal includes the node identifier of the client node.

30. The method according to claim 28, wherein the node identifier includes a home code and a unique home ID.

31. The method according to claim 28, wherein the client node is connected to the communication network via an open communication medium.

32. The method according to claim 31, wherein the open communication medium comprises a power line.

* * * * *